United States Patent

[11] 3,604,852

| [72] | Inventor | Joseph B. Weintraub<br>New York, N.Y. |
|---|---|---|
| [21] | Appl. No. | 15,440 |
| [22] | Filed | Mar. 2, 1970 |
| [45] | Patented | Sept. 14, 1971 |
| [73] | Assignee | Howard Wise<br>New York, N.Y.<br>a part interest |

[54] APPARATUS FOR THE VISUAL AESTHETIC DISPLAY OF SOUND
6 Claims, 4 Drawing Figs.

[52] U.S. Cl. ............................................. 179/1 VS,
178/5.4 R, 178/5.8 R, 84/464
[51] Int. Cl. ............................................. G10l 1/14
[50] Field of Search ............................................. 178/5.4,
5.8; 179/1, 1 VS; 84/464; 40/28.3

[56] References Cited
UNITED STATES PATENTS

| 2,500,646 | 3/1950 | Rilesz | 179/1 VS |
| 2,804,500 | 8/1957 | Giacoletto | 178/5.4 |
| 3,140,347 | 7/1964 | Cohen | 178/5.8 |
| 3,163,077 | 12/1964 | Shank | 179/1 VS |

Primary Examiner—Robert L. Griffin
Assistant Examiner—Richard P. Lange
Attorney—Hubbell, Cohen & Stiefel ABSTRACT: An apparatus for visually displaying aesthetic configurations representative of sound including multicolor kinescope displays in which the degree of sharp curvatures or discontinuities in the configurations being viewed on the kinescope display is substantially reduced by jointly varying beam intensity and beam deflection as a function of sound spectral content.

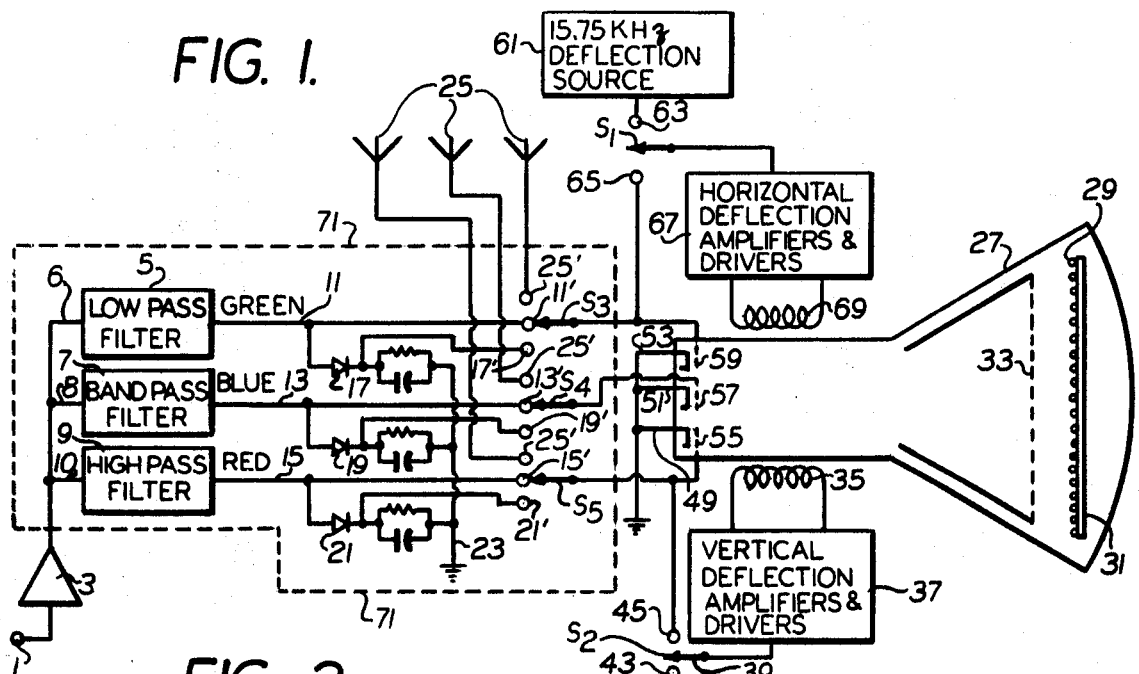
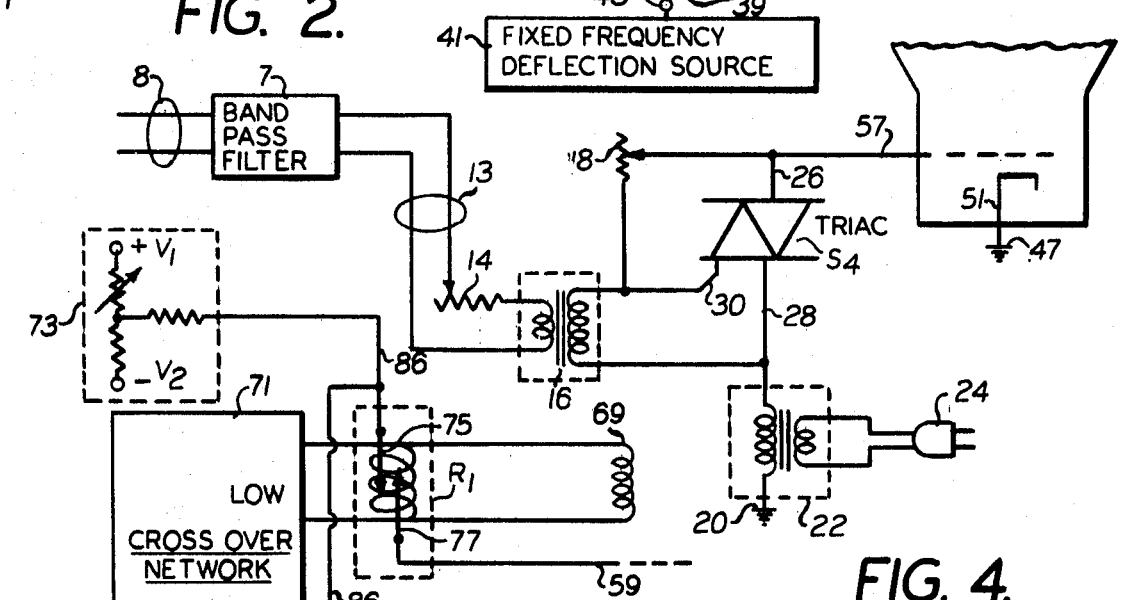
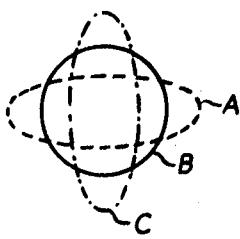
FIG. 4.
INVENTOR
JOSEPH WEINTRAUB
BY
*Hubbell, Cohen & Siegel*
ATTORNEYS.

APPARATUS FOR THE VISUAL AESTHETIC DISPLAY OF SOUND

BACKGROUND OF THE INVENTION

This invention relates to an apparatus for the visual portrayal and interpretation of sound and, more particularly, for the improvement of the kinescopic display of the converted sound.

In the prior art, cathode-ray tube oscilloscopes have long been used for displaying geometric patterns. These patterns would be described by the trace of an electron beam when said beam was, for example, simultaneously displaced by two sinusoidal signals applied respectively to the horizontal and vertical beam-deflecting means. The geometric patterns, termed Lissajous figures, were determinative of a frequency match or integral harmonic relationship between the signals.

In U.S. Pat. No. 2,500,646 to R. R. Riesz, issued on Mar. 14, 1950, asymmetrical speech waves were split into two contiguous frequency bands and applied to pairs of orthogonally disposed beam deflection means of a cathode-ray tube. The resulting patterns were only remotely related to discernible speech. It was not until later that the public became apprised of a system for the visual portrayal of sound through multicolored kinescope patterns. One such system, described in U.S. Pat. No. 2,804,500 to L. J. Giacoletto, split an audio signal into three contiguous frequency bands, and applied the detected envelopes of the bands as varying voltages upon corresponding red, blue, and green control grids of a tricolor kinescope. The resulting kinescope displays show sharp curvatures and discontinuities. Sharp curvatures and discontinuities tend to interfere with a pleasing aesthetic appearance.

It is, accordingly, an object of this invention to devise an apparatus for kinescopically displaying visual representations of sound in which the degree of sharp curvature and discontinuity has been substantially reduced. Relatedly, it is an object that such an apparatus have the visual images it displays be determined solely by the spectral content of the sound. Lastly, it is desired that such an apparatus be of use in black and white as well as multicolored kinescopes.

SUMMARY OF THE INVENTION

It was unexpectedly observed that the degree of sharp curvature and discontinuity in the visual images displayed on the kinescope could be substantially reduced and softened by varying beam intensity and beam deflection as a function of the spectral content of corresponding sound signals. This observation was found to be applicable to black and white TV and multigun color TV. In the latter case, the invention is considered first with two guns and then with all of the guns.

More specifically in the invention, as applied to black and white TV, sound waves from any convenient acoustic source are divided into two frequency bands. The detected envelopes of the electrical variations in the two bands separately drive the respective horizontal and vertical deflection means and bias the electron beam intensity control means.

Correspondingly, in the multigun color kinescope, if only two of the guns are activated, then the detected envelope of one frequency band is applied to the beam intensity control means of a first electron gun and to the vertical deflection means. The detected envelope of the other frequency bank biases the beam intensity control means of a second electron gun and drives the horizontal deflection means. In this case, softly curved traces of varying color intensities and hues are displayed. These softly curved traces are controlled only by the spectral content of the sound signals. Lastly, in order to display the full range of tints and hues available in the tricolor kinescope, the sound wave is preferably partitioned into three different frequency bands. In this case, the detected envelope of the third frequency band is applied to the beam intensity control means of a third electron gun.

In the aforementioned embodiments, the voltage which modulates the corresponding beam intensity also provides the deflection in the corresponding orthogonal plane of the beam. There is no necessity for a fixed vertical or horizontal deflection sweep frequency, which in the extreme high or low frequency ranges contributes to sharp discontinuities in the observed kinescope patterns of the prior art. Furthermore, there is a resulting circuit simplification in view of the absence of any need for a separate deflection source frequency.

The foregoing objects, features, and aspects of this invention will be evident from the detailed description that follows hereinafter when read with reference to the appended drawings.

BRIEF DESCRIPTION OF THE DRAWINGS

FIG. 1 is a schematic representation of the apparatus for kinescopically displaying visual patterns determined solely by the spectral content of a corresponding sound wave;

FIG. 2 is an embodiment of alternative switching means which may be used in FIG. 1;

FIG. 3 shows still another embodiment of the invention employing magnetically actuated switches and a fixed control means bias; and FIG. 4 shows the form of visual traces which appear on the face of a color tube under different conditions.

DESCRIPTION OF THE PREFERRED EMBODIMENT

Referring now to FIG. 1, there is shown a schematic representation of the invention in which tricolor kinescope 27 is shown switchably connected to a group of filters and ultimately to a sound or audio source applied to input terminal 1. Tricolor kinescope 27 may be of any well-known variety, such as, for example, that shown and described in U.S. Pat. No. 2,804,500.

At the electron gun end of the kinescope tube there are shown three emitting cathodes 49, 51, and 53. These cathodes, together with corresponding control electrodes 55, 57, and 59, form three separate electron beams. The control electrodes regulate the intensity of the corresponding three electron beams. As they become more negative with reference to their corresponding cathodes, fewer electrons will be drawn from the space charge adjacent to the cathodes towards the target transparent plate 31 at the viewing end of the kinescope 27. The beams may be deflected by electrostatic or magnetic deflection means. In this embodiment, deflection coils or yokes 69 and 35 are used to control the corresponding horizontal and vertical beam deflection. Transparent plate 31 provides substrate support for a cathodoluminescent phosphor screen 29. A dot form of target screen may be employed in which the dots or phosphors on glass plate 31 are closely spaced in groups of three so that the center of each dot of each of the three colors is located at each apex or corner of an equilateral triangle. A perforated metal sheet 33 commonly known as a "shadow mask" is located in front of the phosphor screen 29 for partially masking the electron beams. The shadow mask 33 is so spaced with respect to the gun and the phosphor dots and has such geometrical properties that the electron beam corresponding to the red components strikes only those phosphor dots which are red emitting. The shadow mask 33 also insures that the electron beams for green and blue strike only green and blue phosphors respectively. Thus, the shadow mask in fact provides means whereby each electron beam has access only to one of three separate areas of a particular type of phosphor, these areas being physically interlaced to permit the production of a line raster by an electron beam which produces an area of illumination when it strikes the target. The line raster is, therefore, made up of a plurality of adjacent elemental areas of illumination in effect controllable as to color and intensity. Since each of the beams is capable of exciting only one of the primary colors, appropriate modulation of the beams with color intelligence will reproduce a picture in full color on the face of kinescope 27.

It is intended that this invention be used with black and white and color television receivers of the type ordinarily used in home reception. Accordingly, it has been found necessary to provide a switching arrangement in which the ordinary television video and audio can be reconnected to the TV when the invention is not in use. Illustratively, fixed frequency deflection source 61 is ordinarily coupled to the horizontal deflection amplifiers and drivers 67 through switch $S_1$ coupled to terminal 63. Also, vertical deflection amplifiers and drivers 37 are actuated by fixed frequency deflection source 41 when switch $S_2$ is connected to terminal 43. Likewise, the video signal ordinarily applied at input 25 is impressed upon corresponding control grids, 55, 57, and 59 when switches $S_5$, $S_4$, and $S_3$ are each coupled to the switch terminal 25'. Switches $S_3$, $S_4$, and $S_5$ may, of course, be electrically, mechanically, or electronically actuated and ganged together. Similarly, switches $S_1$ and $S_2$ may also be likewise instrumented. In the normal operation of this invention, switches $S_3$, $S_4$, and $S_5$ are connected respectively to contacts 11', 13', and 15'. Also, switches $S_1$ and $S_2$ are respectively connected to terminals 65 and 45.

As previously mentioned, any suitable sound source, such as a tape recorder, may be coupled to input terminal 1. The sound wave is amplified by amplifier 3, which also serves to isolate the sound source from the remaining portion of the system. The amplified sound wave is applied simultaneously on paths 6, 8, and 10 to a low-pass filter 5, band-pass filter 6, and high-pass filter 9. Low-pass filter 5 may be designed to have a substantially passband characteristic between 30 to 500 Hz. Band-pass filter 7 should have a passband between 500 to 2,500 Hz., while high-pass filter 9 should pass only those frequency components in excess of 2,500 Hz. The output from each of the filters correspondingly appears on lines 11, 13, and 15.

To each of these paths is connected an envelope detector. Each envelope detector is in the form of a diode with a series RC circuit across which combination a voltage may be developed. The corresponding voltages are applied to their respective grids through their switch connections $S_3$, $S_4$, and $S_5$. Additionally, the voltage developed on line 11 is applied to the horizontal deflection amplifiers and drivers 67 through terminal 65 and switch $S_1$. Likewise, the voltage developed on line 15 is applied through switch $S_5$ and terminal 45 of switch $S_2$ to drive vertical deflection amplifiers and driver 37. The voltages applied to the respective deflection circuits will control the horizontal and vertical sweep of the multibeam.

Because of the comparatively slowly varying envelope content of speech and music, the horizontal and vertical deflection will also tend to vary in a slow and smooth manner. In contrast, if a fixed frequency of deflection is used, such as 1,000 kilohertz or 15.75 kilohertz, it is observed, as for example shown in FIGS. 2 through 4 of U.S. Pat. No. 2,804,500, that sharp bars and discontinuities will appear on the screen face.

Thus, with reference to FIG. 4, it will be seen that when a low frequency audio signal, for example of between 30 and 500 Hz., is applied to the filtering network made up of filters 5, 7 and 9, only grid 59 controlling the green-emitting cathode 53 will be driven positive to such a voltage as to permit the green phosphors in the phosphor screen 29 to be excited, the other grids 55 and 57 not permitting electrons emitted by emitters 49 and 53 to pass through. The trace resulting from such an input will be a flat oval trace such as shown by the dotted oval A of FIG. 4. Similarly, when a midrange sinusoidal input of between about 500 and 2,500 Hz., is applied to the filtering circuit made up of the filters 5, 7 and 9, a blue trace will appear, which blue trace will be circular due to the fact that the horizontal and vertical deflection coils 69 and 35, respectively, are being driven at substantially the same rate. This trace is shown as the solid line circle B in FIG. 4. Likewise, when a high frequency sinusoidal input, for example between about 2,500 and 20,000 Hz., is applied to the filtering network, only a red trace will appear and this trace will be an oval with a vertically extending major axis due to the fact that the vertical deflection coil is being driven more rapidly than the horizontal deflection coil. This trace is shown as dot-dash line C of FIG. 4.

Referring now to FIG. 2, there is shown an electronic switch arrangement for a single channel, which switch, for example, might substitute for $S_4$ in FIG. 1. As a general proposition, any active element having a substantially bistable remnant state and the desired bandwidth or switching speed may be used. Obviously, the design considerations including switching speed, power handling, or dissipation capabilities, and reliability will determine the specific choice.

In FIG. 2, the amplified speech signal from amplifier 3 is applied to band-pass filter 7 over path 8. The voltage variations falling within the 500 to 2,500 Hz. passband appear at the output of filter 7 across the conductors forming line 13. Transformer 16 AC couples the filter 7 output to the input of TRIAC $S_4$. TRIAC $S_4$ is energized from an ordinary 120-volt line applied through connector 24 and AC transformer 22.

The TRIAC $S_4$ performs a switching function. That is, the voltage variations appearing on line 30 appear on TRIAC output path 26. These variations are applied, for example, to control grid 57 of kinescope 27. The sensitivity, and especially the background sensitivity, of the resulting tube display may be enhanced through the use of variable resistances selectively and judiciously placed in the circuit. For example, variable resistance 14 may be added in series with the primary stage of transformer 16. Also, variable resistance 18 may be coupled across the TRIAC terminating respectively on conductors 30 and 26. In this regard, conductor 26 terminates the anode of the TRIAC, while 28 terminates the cathode, and 30 is the equivalent of the gate or signal grid input.

Referring again to FIG. 1, it is observed that the filters 5, 7, and 9, together with the envelope detectors 17, 19, and 21 and the switches $S_3$, $S_4$, and $S_5$, could be replaced by what would generally be termed in the art, a three-way crossover network. This is shown by the dashed element 71.

Referring now to FIG. 3 of the drawing, there is shown another embodiment of the invention employing magnetically actuated relays. The low frequency output from crossover network 71 drives horizontal deflection circuit yoke 69 as well as being coupled to a reed relay $R_1$. Similarly, the band-pass output from network 71 is connected to a reed relay $R_2$. Lastly, the high frequency from network 71 drives vertical deflection yoke 35 while being also coupled to a reed relay $R_3$.

Relays $R_1$, $R_2$, and $R_3$ have their respective coil windings across the crossover network 71 low, middle, and high frequency outputs. This places coil for relay $R_1$ in parallel with horizontal deflection yoke 69 with the coil for $R_3$ in parallel with vertical deflection yoke 35.

Voltage source 73 provides a voltage bias, when suitably and appropriately connected, to control grids 55, 57, and 59. The voltage from source 73 is applied along path 86. Path 86 terminates in relay reed element 75 for relay $R_1$, reed element 79 for relay $R_2$, and reed element 83 for relay $R_3$.

When the low frequency output is applied to the horizontal yoke 69, a horizontal sweep of the electron beams results. When the high frequency output is applied to the vertical yoke 35, a vertical sweep results. The appearance of an output on any of the relay coils $R_1$, $R_2$, and $R_3$ results in a latching of the reed elements. Thus, the presence of a low frequency output will cause the latching of reed elements 75–77, resulting in the impressing of the voltage from source 73 on control grid 59. Likewise, a band-pass output on relay $R_2$ will latch reed elements 79 and 81 so that the voltage output from source 73 appears on grid 57. Likewise, a high frequency output on relay $R_3$ latches reed elements 83 and 85 together so that voltage from source 73 appears on control element 55. The actual voltage from source 73 may be adjusted to an empirical optimal value.

The foregoing embodiments are to be taken as illustrative only. It is expected that one skilled in this art with the teachings of this invention in hand would be able to devise numerous alternatives without departing from the spirit and scope of this invention.

What is claimed is:

1. In an apparatus for visually displaying aesthetic configurations representative of sound signals, which sound signals have been converted into corresponding electrical variations, said apparatus including a two-color kinescope having vertical and horizontal beam deflection means and a pair of electron guns with a pair of corresponding electron beam intensity control means, the combination comprising:

means for receiving and separating the electrical variations into two different frequency bands;

means for coupling one of the electron beam intensity control means and the vertical beam deflection means to said frequency-band-separating means for response to one of said frequency bands and not to the other of said bands; and means for coupling the other of said electron beam intensity control means and the horizontal beam deflection means to said frequency-band-separating means for response to said other of said frequency bands and not to said one of said bands.

2. The apparatus of claim 1, wherein each of said coupling means includes:

means for detecting the envelope of its respective frequency band; and means for coupling said respective envelope-detecting means to its associated deflection means and beam intensity control means.

3. An apparatus according to claim 2, wherein:

said kinescope is a three-color kinescope having a third electron gun and a corresponding intensity control means; and the frequency-separating means includes means for partitioning the electrical variations into three different frequency bands;

the apparatus further comprising:

means for detecting the envelope of said third frequency band; and means for applying the detected envelope of the third frequency band to the beam intensity control means of said third electron gun.

4. An apparatus according to claim 3, wherein:

said means for applying said detected envelope is effective for applying it only to said beam intensity control means of said third electron gun.

5. In an apparatus according to claim 2, the pair of means for detecting the envelopes of the electrical variations include:

a pair of switching rectifier means, each rectifier means having an anode, signal bias, and cathode terminals, said anode terminals coupling the means for applying the detected envelope, said signal bias terminals being responsive to the electrical variations of a corresponding frequency band; and a source of power bias connecting the cathode terminal to a constant reference.

6. In an apparatus according to claim 2, the means for applying the detected envelope to the beam intensity control and the vertical deflection means, and the means for applying same to the beam intensity control and horizontal deflection means each including:

a magnetically operable reed relay, the coil of each of said reed relays coupling the associated deflection means and being driven by the corresponding detected envelope output, the contacts of said reed relay connecting the intensity control means to a voltage source.